July 10, 1928.  G. DE RENZIS  1,676,981
APPARATUS FOR THE MANUFACTURE OF BOTTLES AND OTHER GLASS HOLLOW WARE
Filed June 23, 1926
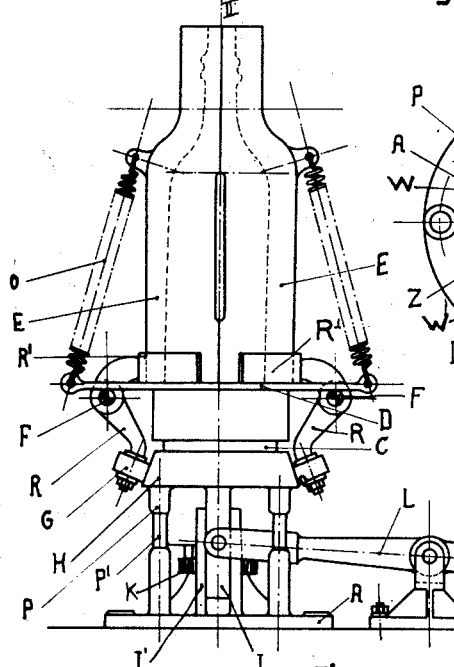
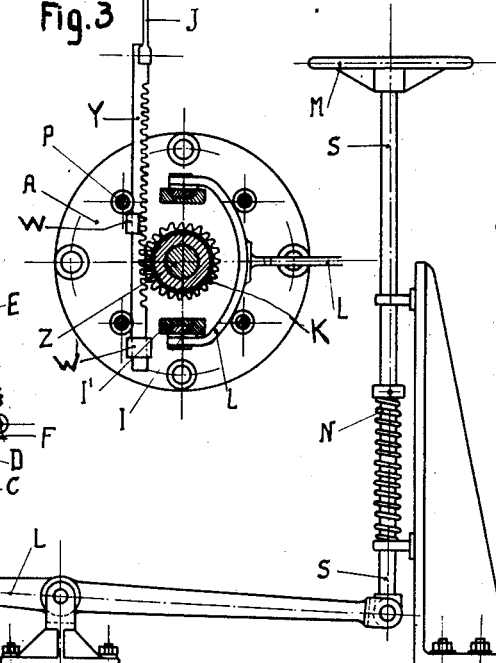
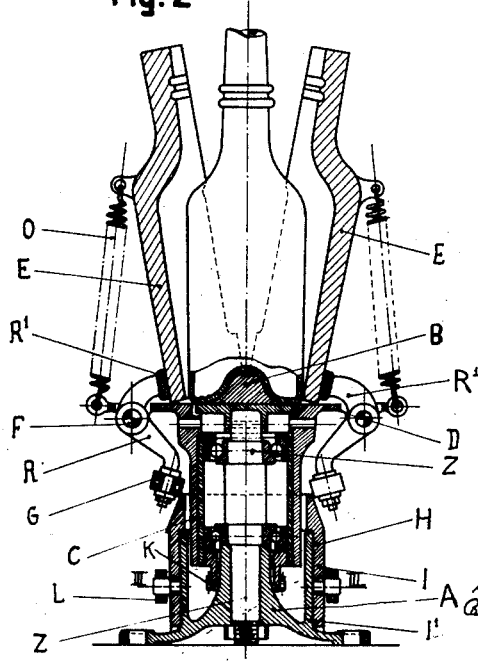
Inventor,
Guglielmo De Renzis Patented July 10, 1928.

1,676,981

UNITED STATES PATENT OFFICE.

GUGLIELMO DE RENZIS, OF SARZANA, ITALY.

APPARATUS FOR THE MANUFACTURE OF BOTTLES AND OTHER GLASS HOLLOW WARE.

Application filed June 23, 1926, Serial No. 118,050, and in Italy March 24, 1926.

This invention has for its object an apparatus for the manufacture of bottles and other glass hollow ware, characterterized by the fact that the glass is stationary on a fixed base while the mould is caused to rotate.

An oscillating and continuous movement from right to left and vice versa is imparted to the mould, which will conveniently make ½ or ⅓ turn in both directions and stop when it is to be opened.

This apparatus comprises a fixed base on which is secured a vertical pin carrying an interchangeable fixed disc, on which the glass rests and the upper face of which is shaped correspondingly to the desired shape of the bottom of the bottle.

On the pin is rotatably mounted a sleeve ending at its upper part with a mould supporting ring. Means are provided for keeping the mould in the closed position and opening the same at the desired moment by means of an actuating mechanism preferably operated by means of a foot lever. The oscillation of the mould may be effected by hand or through electrical or mechanical means and is stopped when the mould is opened.

In the annexed drawings is shown diagrammatically and by way of example a constructional form of the apparatus forming the object of this invention.

Fig. 1 is a side view of the apparatus in the operative position.

Fig. 2 is a vertical axial section thereof, the mould being in the open position.

Fig. 3 is a horizontal section on line III—III of Fig. 2.

Referring to the drawings, A is a base carrying a fixed pin Z, on which is mounted an interchangeable disc B, the upper face of which is shaped to correspond to the bottom of the bottle or other hollow ware. On the pin Z is mounted capable of rotating, and preferably on thrust ball bearings, a sleeve C ending at its upper extremity with a ring D supporting the mould E. The sleeve C and the ring D, shown in one piece for the sake of simplicity and clearness, will in the practice be made in several pieces in order to facilitate their construction and fitting.

The mould E, which is conveniently made in two parts, is maintained in the closed position and fixed to the ring D by means of two half-rings R' carried by the levers R pivoted at F to the ring D. The half-rings R' are secured to the levers R in such a way as to be easily removed and replaced by other rings of different size thus rendering the machine suitable for any pattern.

A conical ring H mounted vertically movable in suitable slides of the apparatus frame acts on the levers R for closing the mould.

For this purpose the lower free ends of the levers R are provided with rollers or ball bearings G cooperating with the conical ring H, on which they rotate during the operation of the apparatus. Between the upper part of the elements of the mould E and a fixed point of the ring D are arranged springs O that will automatically open the mould as soon as the conical ring H is lowered, while by raising this latter the mould will be closed against the action of said springs.

In order to effect said movement of the ring H by means of a foot lever, a lever L is provided having at one end a fork pivoted to rods I of the ring H arranged in slides I' of the frame and at its other end an arm pivoted to a vertical rod S provided with a foot plate M. A spring N holds the foot plate M in the raised position and the ring H lowered, so that the springs O will open the mould E; by pressing on the foot plate M against the action of the spring N, the ring H is raised and will close the mould E by means of the levers R.

The ring H will be conveniently provided with slides P sliding in uprights P' of the base of the apparatus.

A hand lever may be used instead of a foot lever for effecting the motion of the ring H.

The apparatus may be operated by a hand or foot operating means but preferably by means of a motor.

The oscillations of the ring D may be obtained in different ways, for instance, as shown in Fig. 3, by means of a wheel K connected with the rotating part and engaging with a rack Y guided in bearings W and hinged on a connecting rod J operated by a crank lever X. The continuous circular movement of the crank lever X is transformed in a reciprocating rectilinear movement of the rack Y and finally in an oscillatory circular movement of the wheel K and therefore of all the movable part of the apparatus carrying the mould.

What I claim is:

1. An apparatus for the manufacture of bottles and other hollow ware, comprising a fixed pin, an interchangeable glass supporting disc mounted on the pin, a ring supporting the mold rotatably mounted on the pin, a conical ring coaxial with the latter, means for axially moving the ring, levers actuated by the conical surface of said ring to close said mold, and springs for opening the latter.

2. An apparatus for the manufacture of bottles and other hollow ware, comprising a fixed pin, an interchangeable glass supporting disc carried on one end of the pin, a ring supporting the mold rotatably mounted on said pin, means for imparting an oscillatory circular movement to said ring, a conical ring coaxial with the pin, means for axially moving the ring, levers actuated by the conical surface of said ring to close said mold, and springs for automatically opening the latter.

3. An apparatus for the manufacture of bottles and other hollow ware, comprising a fixed pin, an interchangeable glass supporting disc carried on one end of the pin, a conical ring coaxial with the latter, levers operable by conical surface of the ring to close the mold, springs for opening the latter, a foot plate, a lever operatively connecting the foot plate with the conical ring, a spring normally holding the foot plate raised and the mold open whereby the latter is closed by depressing the foot plate.

4. An apparatus for the manufacture of bottles and other hollow ware, comprising a fixed pin, a stationary support mounted on the latter, a sleeve rotatably mounted on the pin, bell-crank levers pivotally connected with the sleeve, mold sections carried on the upper end of the levers, a concentric conical ring surrounding the sleeve, means for moving the ring into and out of contact with the lower ends of the levers, a gear on the sleeve, a rack bar engaging the gear, and mechanism for reciprocating the rack to impart a circular oscillatory movement to the sleeve.

In testimony that I claim the foregoing as my invention, I have signed my name.

GUGLIELMO DE RENZIS.